United States Patent
Khan et al.

(10) Patent No.: US 10,306,578 B2
(45) Date of Patent: May 28, 2019

(54) EASY CONNECTIVITY PROVISIONING FOR CELLULAR NETWORK

(71) Applicant: Verizon Patent and Licensing Inc., Arlington, VA (US)

(72) Inventors: Taussif Khan, Martinsville, NJ (US); Manuel Enrique Caceres, Basking Ridge, NJ (US); Warren Hojilla Uy, Randolph, NJ (US); Ruben Cuadrat, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/791,797

(22) Filed: Oct. 24, 2017

(65) Prior Publication Data

US 2019/0124616 A1 Apr. 25, 2019

(51) Int. Cl.
*H04W 60/00* (2009.01)
*H04W 8/20* (2009.01)
*H04W 12/06* (2009.01)
*H04W 84/04* (2009.01)

(52) U.S. Cl.
CPC ........... *H04W 60/00* (2013.01); *H04W 8/205* (2013.01); *H04W 12/06* (2013.01); *H04W 84/042* (2013.01)

(58) Field of Classification Search
CPC ... H04W 60/00; H04W 12/06; H04W 84/042; H04M 1/725; H04M 15/66

USPC ......................................................... 455/418
See application file for complete search history.

(56) References Cited

U.S. PATENT DOCUMENTS

| | | | |
|---|---|---|---|
| 2011/0280228 A1* | 11/2011 | McCann | H04W 48/14 370/338 |
| 2014/0040991 A1* | 2/2014 | Potonniee | H04L 63/08 726/4 |
| 2015/0180847 A1* | 6/2015 | Nix | H04L 9/0869 713/168 |
| 2016/0020803 A1* | 1/2016 | Cha | H04W 76/10 455/558 |
| 2016/0094988 A1* | 3/2016 | Lee | H04L 9/0825 380/270 |
| 2017/0373845 A1* | 12/2017 | Nix | H04W 4/70 |
| 2018/0014339 A1* | 1/2018 | Baek | H04W 76/10 |
| 2018/0027538 A1* | 1/2018 | Uchiyama | H04W 76/14 370/329 |

* cited by examiner

*Primary Examiner* — Inder P Mehra

(57) ABSTRACT

A device may scan for a carrier that includes an embedded Universal Integrated Circuit Card (eUICC), wherein the carrier is associated with a Mobile Network Operator (MNO). The device may hop on the carrier, authenticate with a network of the MNO without using an MNO profile stored in the eUICC, and gain limited access to the network in response to the authentication. The device may also register with the network while attached to the network. The registering may include downloading an operational MNO profile to the eUICC in the device and storing the MNO profile on the eUICC.

20 Claims, 8 Drawing Sheets

EASY CONNECTIVITY PROVISIONING FOR CELLULAR NETWORK

BACKGROUND INFORMATION

Universal Integrated Circuits Cards (UICCs) are also known as smart cards. Typically, UICCs are used in mobile devices in Global System for Mobile (GSM) communications and Universal Mobile Telecommunications System (UMTS) networks for device identification. A UICC may include its own central processing unit (CPU), read-only-memory (ROM), Random Access Memory (RAM), as well as an International Subscriber Identity Module (SIM) profile and one or more SIM applications. The applications may control access to GSM/UMTS networks.

An embedded UICC (eUICC) includes many features new to UICC. For example, an eUICC maybe manufactured in different form factors; may be soldered onto a host device; may include multiple mobile network operator (MNO) profiles; and may have the capability to securely add, delete, and modify MNO profiles over-the-air (OTA). eUICCs have applications not only for smart phones, but for machine-to-machine (M2M) communications between Internet-of-Things (IoT) devices and infrastructure components.

DETAILED DESCRIPTION OF PREFERRED EMBODIMENTS

The following detailed description refers to the accompanying drawings. The same reference numbers in different drawings may identify the same or similar elements.

An embedded Universal Integrated Circuit Card (eUICC) may include a default mobile network operator (MNO) profile, which may be used to connect to a particular MNO. However, using the default profile requires the MNO to contractually lock down the device hosting the eUICC. The lockdown may not be desirable where the user wants to switch to another MNO.

In embodiments described herein, to allow the user of a mobile device ("user device" or "user equipment") to select an MNO or to allow the user to easily switch from one MNO to another, the user device may include a connectivity manager/logic for establishing an initial communication session with an MNO not designated by the default MNO profile provided in the eUICC. By allowing user devices to connect to MNOs other than the MNO designated by the default MNO profile, the embodiments described herein may decentralize the need to obtain connectivity for downloading an operational profile, to avoid concentrating profile downloads on a particular MNO and to spread profile-related connectivity across multiple MNOs.

In one embodiment, the connectivity manager within a user device includes logic for carrier hopping. The connectivity manager may drive the device to scan the air waves for available carriers. When the device hops onto a particular carrier, the device (or the user) may decide to download an MNO profile and subscribe to the MNO. If the device decides not to subscribe and/or download the MNO profile, the device may continue to hop through different carriers.

Figure 1:
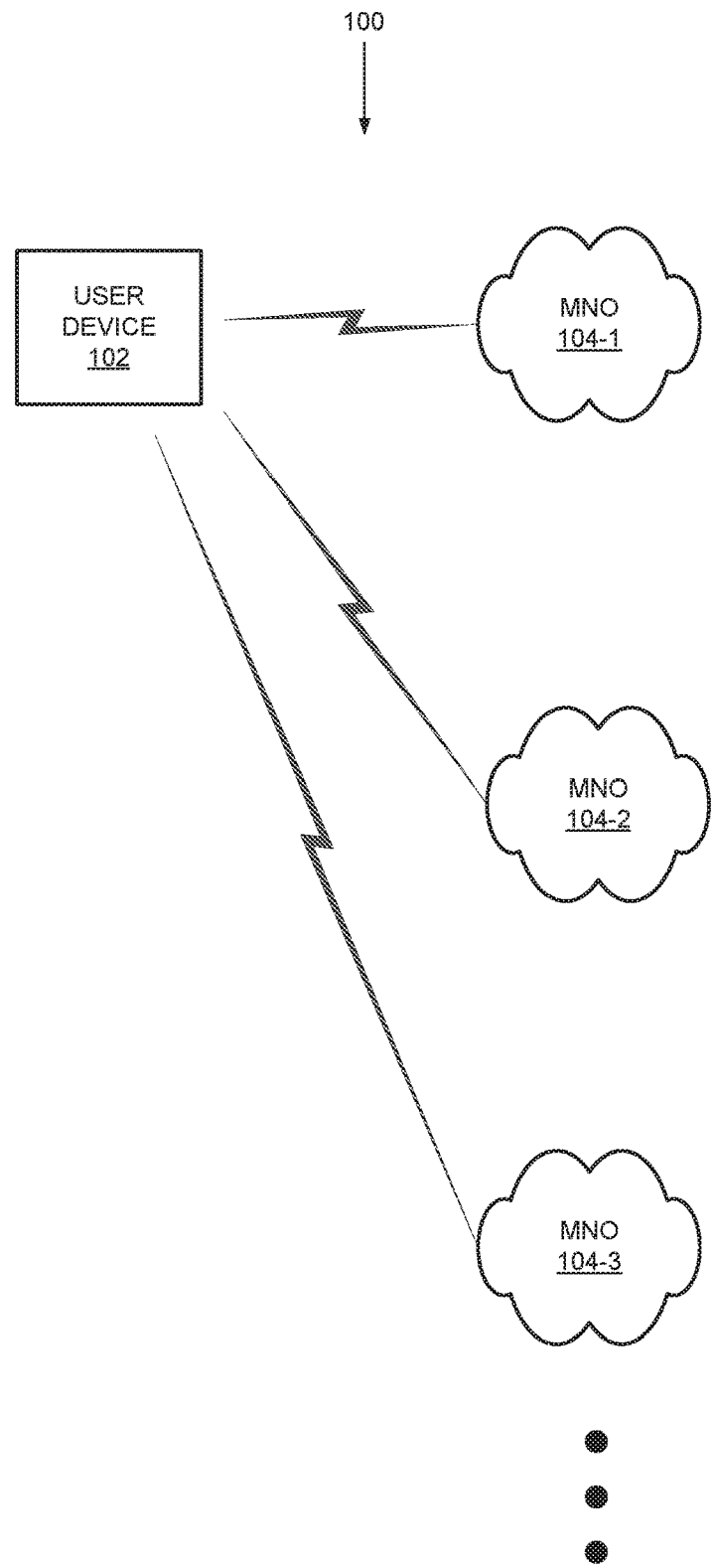
FIG. 1 illustrates the concepts described herein.

FIG. 1 illustrates the above concepts 100. As shown, concepts 100 include a user device 102 (also "user equipment") and MNOs 104-1, 104-2, and 104-3. Concepts 100 may also include, corresponding to each of the MNOs, an SM-DP 224-1 and connectivity portal 226-1, SM-DP 224-2 and connectivity portal 226-2, and SM-DP 224-3 and connectivity portal 226-3. These devices and components are described in greater detail below with respect to FIG. 2.

In FIG. 1, user device 102 may be preloaded, for example, as part of its firmware, with a connection manager. When the connection manager attempts to establish a connection and subscribe to an MNO (e.g., the user wants to switch to another carrier), rather than relying on the default MNO profile on the eUICC installed within the user device, the connection manager may execute its connectivity provisioning procedure. The procedure allows user device 102: to avoid relying on the default MNO profile; and to have an option not to preload profiles for MNOs (e.g., an MNO with no coverage of an area (domestic and foreign)).

To start the procedure, the connectivity manager may scan the air waves for a carrier. Assuming that user device 102 hops on a carrier (e.g., MNO 104-1), user device 102 may be authenticated based on a mechanism/procedure that does not rely on a bootstrap/default profile (e.g., an MNO profile used to connect to the MNO prior to subscribing to the MNO) on the eUICC. After a successful authentication, the connectivity manager on user device 102 may then interact with MNO 104-1 in limited ways (e.g., view options for subscription) and/or subscribe to MNO 104-1 services. If user device 102 does subscribe to MNO 104-1 services, user device 102 may obtain MNO 104-1's operational profile via the eUICC within user device 102. The connectivity manager may then terminate the provisioning procedure.

On the other hand, if user device 102 decides to select another MNO 104 for services or if MNO 104-1 requests user device 102 to disconnect, user device 102 may hop off the carrier and hop on the carrier for MNO 104-2. The connectivity manager may repeat the procedure described above with respect to MNO 104-1, at MNO 104-2, until user device 102 subscribes with MNO 104-2 or moves onto another carrier (e.g., MNO 104-3, etc.), and so on, until the provisioning procedure terminates.

Figure 2:
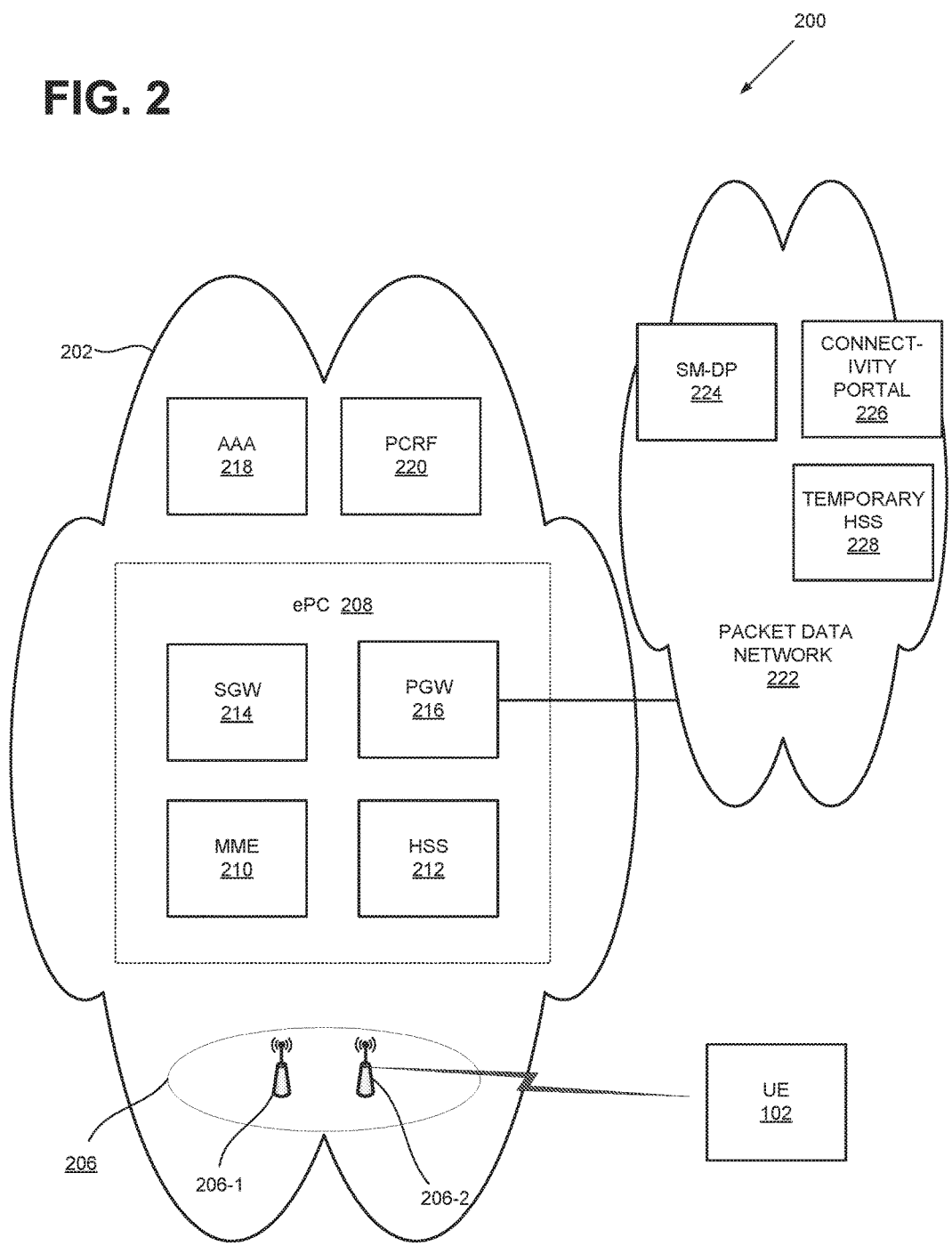
FIG. 2 illustrates an exemplary environment in which concepts described herein may be implemented.

FIG. 2 illustrates an exemplary environment 200 in which concepts 100 can be implemented. As shown, environment 200 includes user device 102, network 202 (also referred to as "mobile network operator"), packet data network (PDN) 222, SM-DP 224, connectivity portal 226, and a temporary home subscriber server (HSS) 228. Depending on the implementation, environment 200 may include additional, fewer, different, or a different arrangement of components than those illustrated in FIG. 2. For example, in a different embodiment, environment 200 may include millions of user devices and/or additional wireless networks.

User device 102 may include an eUICC device. User device 102 may be implemented as, for example, a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, a digital camera that includes communication capabilities (e.g., wireless communication mechanisms), or Internet-of-Things (IoTs). In a long-term evolution (LTE) environment, user device 102 may be referred to as user equipment (UE), as indicated above with respect to FIG. 1.

For the purpose of identification and exchanging information with MNO 202 (e.g., authentication, profiles, etc.), user device 102 includes a connectivity manager. As already discussed above, the eUICC may allow user device 102 to securely download, store, modify, and delete MNO profiles, and to connect to MNOs whose profiles are currently stored in the eUICC.

The connectivity manager may be preloaded as part of user device 102 firmware. When the connection manager attempts to establish a connection and subscribe to an MNO 202 (e.g., user wants to switch to MNO 202 or subscribe to MNO 202 as its very first service provider), rather than relying on the default MNO profile on the eUICC installed within user device 102, the connection manager may execute the connectivity provisioning procedure.

To start the procedure, the connectivity manager scans the air waves for a carrier. The scanning may be performed based on a hopping algorithm; based on a list of MNOs provided to user device 102 (e.g., manufacturers may advertise which carriers they support); and/or based on discriminatory policies to hop on and off a carrier. To allow the user to instruct user device 102 to connect to a specific network, the connectivity manager on user device 102 may include a graphical user interface for receiving user input.

Assuming that user device 102 hops on a carrier (e.g., MNO 202), user device 102 may be authenticated based on a mechanism/procedure that does not rely on a bootstrap/default profile. The mechanism/procedure is described below with reference to FIGS. 6A and 7.

After a successful authentication, the connectivity manager on user device 102 may establish a communication session with a connectivity portal 226. When the connectivity manager establishes the communication session with portal 226, user device 102 may interact with MNO 202 in various ways (e.g., view options for subscription, view advertisements for MNO 202, etc.) and/or subscribe to MNO 202 services. If user device 102 does subscribe to MNO 202, user device 102 may obtain MNO 202's operational profile from SM-DP 224 via the eUICC within user device 102. The connectivity manager may then terminate the provisioning procedure.

On the other hand, if user device 102 decides to select another MNO for services or if MNO 202 requests user device 102 to disconnect, user device 102 may hop off the carrier, and search for and hop on the carrier for another MNO (e.g., MNO 104-1, 104-2, etc.). The connectivity manager may then repeat the procedure described above with respect to the other MNO, until user device 102 subscribes with the other MNO or moves onto yet another carrier, and so on until the procedure terminates.

In one embodiment, MNO 202 may include a Long Term Evolution (LTE) network that includes an evolved UMTS Terrestrial Network (eUTRAN) 206, evolved packet core (ePC) 208, Authentication Authorization and Accounting (AAA) server 218, and PCRF 220. As further shown in FIG. 2, ePC 208 may include a Mobility Management Entity (MME) 210, HSS 212, SGW 214, and Packet Data Network Gateway (PGW) 216.

eUTRAN 206 may include one or more eNodeBs 206-1 and 206-2 (herein collectively referred to as "eNodeB 206"). eNodeB 206 may include one or more devices and components that allow user device 102 to wirelessly connect to MNO 202.

MME 210 may provide control plane processing for ePC 208. For example, MME 210 may implement tracking and paging procedures for user device 102, may activate and deactivate bearers for user device 102, may authenticate a user of user device 102, and may interface to non-LTE radio access networks. A bearer may represent a logical channel with particular QoS requirements. MME 210 may also select a particular SGW 214 for a particular user device 102. A particular MME 210 may interface with other MME 210 in ePC 208 and may send and receive information associated with user devices, which may allow one MME to take over control plane processing of user devices serviced by another MME, if the other MME becomes unavailable.

When MME 210 receives an authentication request (and perhaps some metadata) from user device 102, MME 210 may determine, based on the request, whether the eUICC in user device 102 has MNO 202's operating profile. On one hand, if the eUICC does not have such a profile, MME 210 may obtain a temporary authentication vector from temporary HSS 228. On the other hand, if the request indicates that the eUICC in user device 102 already has an operating profile from MNO 202, MME 210 may obtain the authentication vector from HSS 212. Although HSS 212 and temporary HSS 228 are illustrated as separate network devices, in some implementations, HSS 212 and HSS 228 may be implemented as a single device.

HSS 212 may provide user subscription, registration, and profile information to other components in an LTE, and store such information at itself or other components (e.g., AAA 218). In one implementation, HSS 212 may store and/or access authentication information at AAA 218. When MME 210 requests HSS 212 for authentication data, HSS 212 may access AAA 218 to retrieve the data and provide it to MME 210.

SGW 214 may provide an access point to user device 102, handle forwarding of data packets for user device 102, perform transport level markings (e.g., QoS Class Identifier (QCI)), and act as a local anchor point during handover procedures between eNodeBs 206.

In addition, SGW 214 may forward messages between MME 210 and PGW 216. For example, when SGW 214 receives a message from MME 210 indicating that user device 102 is unavailable to accommodate a request to change the bearer, SGW 214 may forward the message to PGW 216.

PGW 216 may function as a gateway to packet data network 222. In addition, when user device 102 attaches to MNO 202 (through either eUTRAN 206 or through a wireless network), PGW 216 may allocate an IP address for user device 102. Additionally, when PGW 216 receives a message from PCRF 220 to modify a QoS for user device 102, PGW 216 may dispatch a message to MME 210 (via SGW 214) to change the bearer for user device 102.

In some implementations, PGW 216 may forward messages to and from devices in MNO 202 to other devices in packet data network 222. For example, PGW 216 may deliver messages between MME 210 and SM-DP 224, connectivity portal 226, and temporary HSS 228, assuming that SM-DP 224, connectivity portal 226, and temporary HSS 28 reside within packet data network 222.

AAA 218 may store and/or provide authentication, authorization, and/or accounting information to components of MNO 202. In one embodiment, AAA 218 may provide such information in accordance with the DIAMETER protocol.

PCRF 220 may provide policy control decisions and flow based charging control functionalities. PCRF 220 may provide network control regarding service data flow detection, gating, QoS and flow based charging, etc. PCRF 220 may determine how a certain service data flow may be treated, and ensure that user plane traffic mapping and treatment are in accordance with a user's subscription profile. For example, PCRF 220 may identify and apply a user profile related to user device 102 when exchanging data using a conventional handling procedure.

Packet data network (PDN) 222 may include a network that supports Internet Protocol (IP)-based communications. PDN 222 may include, for example, an IP Multimedia Subsystem (IMS) network, which may provide voice and multimedia services to user device 102 based on Session Initiation Protocol (SIP). Depending on the implementation, SM-DP 224, connectivity portal 226, and/or temporary HSS 228 may be part of PDN 222.

SM-DP 224, in this specification, may include not only a Subscription Manager Data Preparation (SM-DP) but other components, such as Subscription Manager Secure Routing (SM-SR) in the eUICC ecosystem. In the ecosystem, an SM-DP may generate profiles and install them on eUICCs through the SM-SR. The SM-SR may establish a secure and authenticated transport channel to an eUICC to manage the eUICC platform. The SM-SR may load, enable, disable, and/or delete MNO profiles on the eUICC in accordance with MNO 202's policy rules.

Connectivity portal 226 may provide a network location at which user device 102 may stay connected after user device 102 authenticates to MNO 202 without an MNO profile. In some implementations, connectivity portal 226 may provide a "waiting room," a network location which user device 102 may remain connected to or access. In one implementation, when user device 102 is at a waiting room, user device 102 may browse different service options and/or advertisements, or subscribe to different services offered by MNO 202.

Temporary HSS 228 may provide authentication vectors to MME 210, for authenticating user devices that are connecting, to MNO 202, without an MNO profile for MNO 202 or a default MNO. Although HSS 228 is illustrated as being outside of MNO 202, in some implementations, temporary HSS 228 may be located within MNO 202. Depending on the implementation, temporary HSS 228 may include its own database for storing authentication information, or alternatively, may obtain such information from AAA 218.

While FIG. 2 shows exemplary components of networks in environment 200, in other implementations, environment 200 may include fewer components, different components, differently arranged components, or additional components than depicted in FIG. 2. Additionally, or alternatively, one or more components in environment 200 may perform functions described as being performed by one or more other components.

Figure 3:
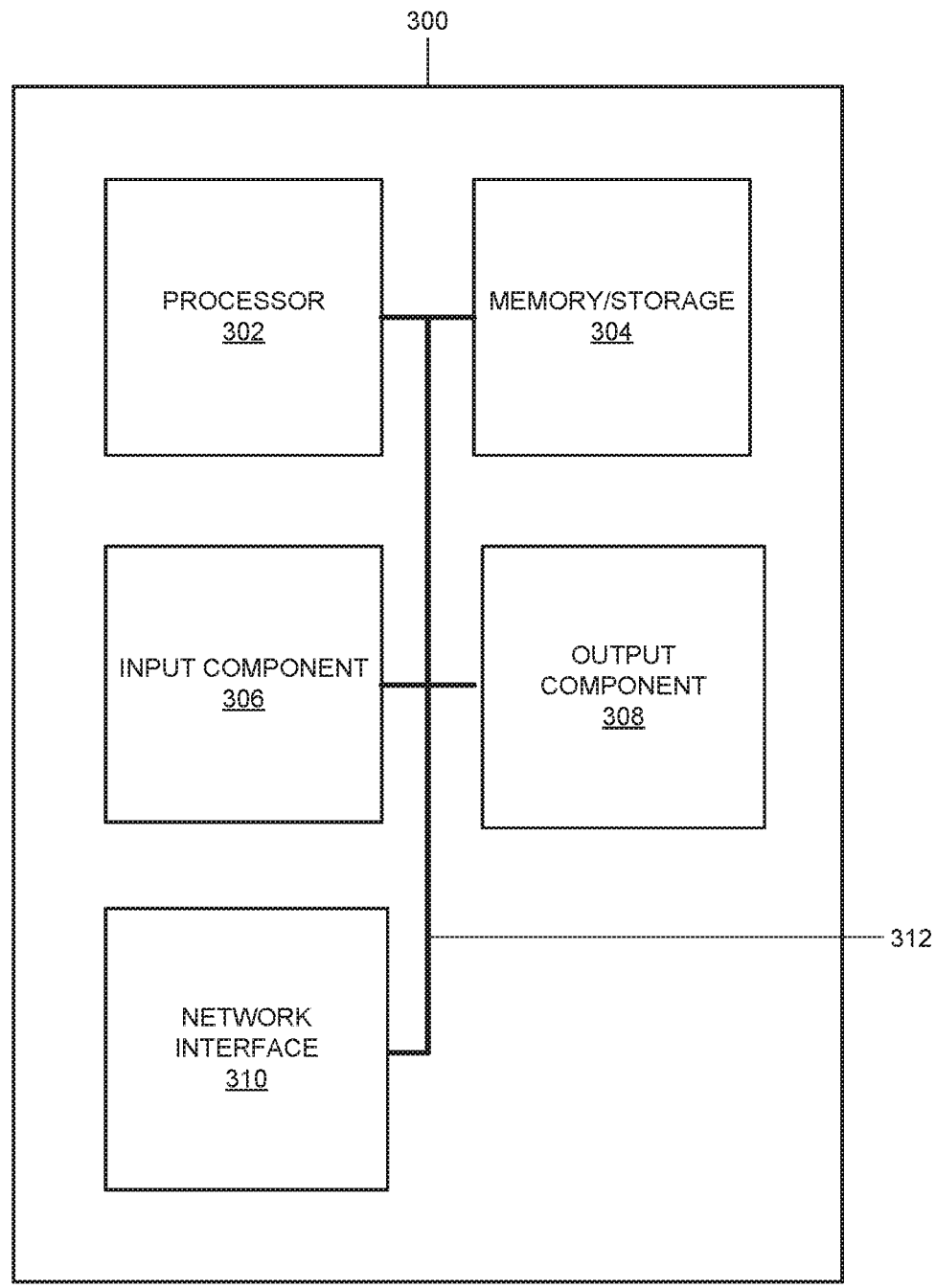
FIG. 3 illustrates exemplary components of the network devices of FIGS. 1 and 2.

FIG. 3 is a block diagram of exemplary components of a network device 300. Network device 300 may correspond to or be included in any of the devices and/or components illustrated in FIG. 1 and FIG. 2 (e.g., user device 102, MNO 202, PDN 222, etc.).

As shown, network device 300 may include a processor 302, memory/storage 304, input component 306, output component 308, network interface 310, and communication path 312. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface through which components of device 300 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein.

For example, when network device 300 is implemented as user device 102, the connectivity manager in user device 102 may direct user device 102 to perform carrier hopping and/or processes for establishing a connection with a MNO without relying on a default MNO profile.

In another example, when network device 300 is implemented as MME 210, programs on MME 210 may determine whether an authentication request is for establishing a connection without a default MNO profile. The programs may obtain the authentication vector from HSS 212 or from temporary HSS 228.

Figure 4:
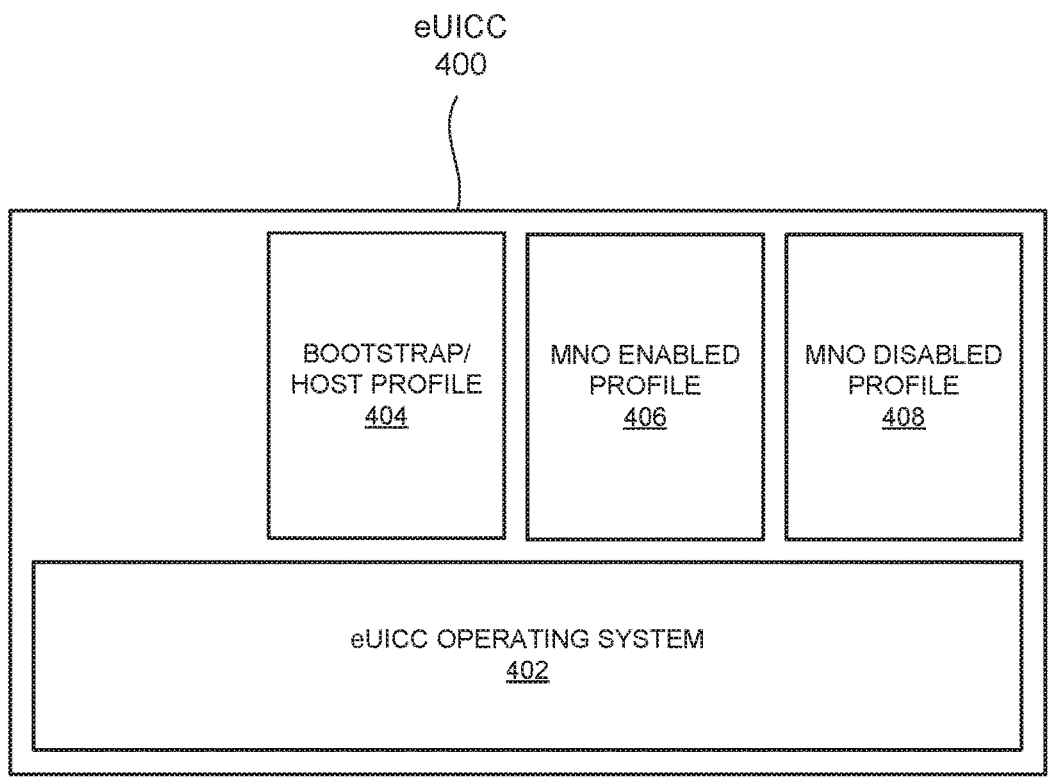
FIG. 4 illustrates some exemplary components of the embedded Universal Integrated Circuit Card (eUICC) within the user device of FIGS. 1 and 2.

FIG. 4 illustrates some exemplary components of an eUICC 400 within user device 102. As shown, eUICC 400 may include an operating system 402, a bootstrap/host profile 404, an MNO enabled profile 406 and an MNO disabled profile 408.

Operating system 402 may manage computing resources of eUICC 400. Operating system 402 may include telecommunication components, mechanisms for enforcing policy/rules, etc.

Host profile 404 may include information for connecting to an MNO for bootstrapping and or provisioning. The connection may be for limited purposes, such as downloading an operational profile.

MNO profiles 406 and 408 include properties associated with an MNO. Each profile may include a file system, policy rules, applications, and security domains. Each security domain provides: storage for securely storing encryption/decryption keys; mechanisms for accessing components/devices that are off card based on secure protocols; mechanisms for loading applications; and security services. According to one implementation, only one MNO profile may be active at a time.

Although not illustrated, eUICC 400 may also include other components. For example, eUICC 400 may include a certificate security domain, issuer security domain, issuer security domain-root, etc. for communications and process execution in accordance with various security requirements.

Figure 5:
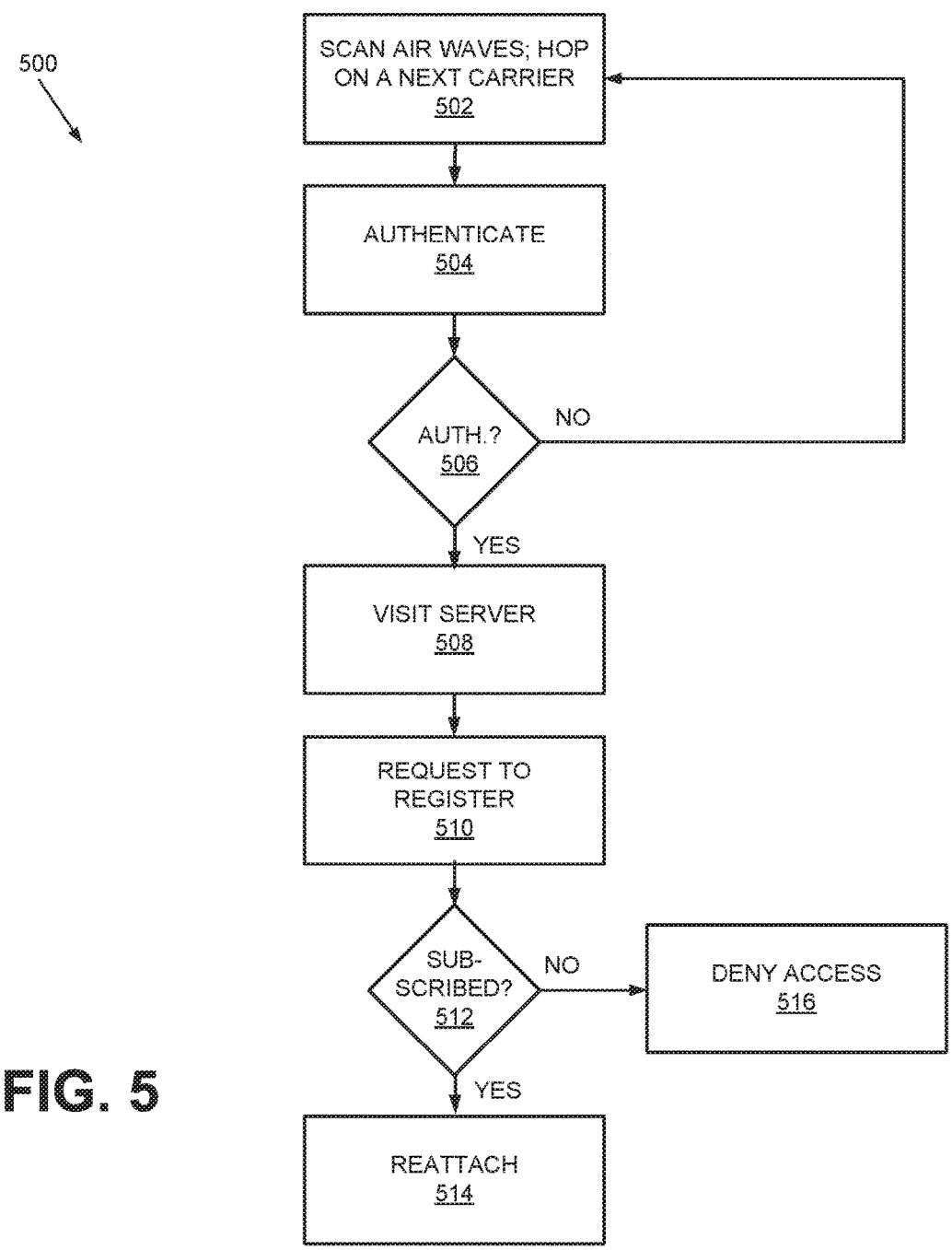
FIG. 5 illustrates an exemplary process associated with selecting a carrier network, by the user device of FIGS. 1 and 2, according to one implementation.

FIG. 5 illustrates an exemplary process 500 associated with selecting a carrier by user device 102. Process 500 may be performed by one or more devices and components of environment 200. In some implementations, based on user input provided through a user interface, process 500 may terminate at any block in process 500.

As shown, process 500 may include user device 102 scanning the air waves for a carrier and hopping onto a selected carrier (block 502). The scanning may be performed in various ways: based on a hopping algorithm; based on a list of MNOs provided to user device 102 (e.g., manufacturers may advertise which carriers they support); and/or based on discriminatory policies to hop on and off a carrier.

In some implementations, a user may provide input in selecting a particular MNO. To accommodate such users, the connectivity manager on user device 102 may include a user interface that helps the user to select a particular MNO.

Process 500 may also include user device 102 authenticating at MNO 202 (block 504). In performing the authentication during process 500, user device 102 may not use a default or a bootstrap profile, or an MNO profile pertaining to MNO 202 (it is not on the eUICC of user device 102). The authentication step/process of block 504 is described below with reference to FIGS. 6A and 7.

Assuming that user device 102 hops on a carrier (e.g., MNO 202), user device 102 may determine whether the authentication was successful (block 506). If the authentication was unsuccessful (block 506: no), process 500 may hop off the carrier and return to block 502, to select and hop onto the next available carrier, If the authentication was successful (block 506: yes), user device 102 may reach out to a server (block 508). In some implementations, the server address may be negotiated after the authentication. In other implementations, the address may be provided to user device 102 as part of its firmware. The server may be installed at connectivity portal 226.

When user device 102 reaches portal 226, user device 102 may interact with MNO 202 in various ways. The interaction may involve viewing various subscription options, available programs, viewing advertisements, etc.

In some implementations, user device 102 may request (or be requested) to register/subscribe at the server (block 510) and user device 102 may perform the registration or subscription. As part of the registration, user device 102 may obtain an operational MNO profile. The profile may be stored on the eUICC and enabled, with other profiles on the eUICC disabled. The registration process is described below with reference to FIGS. 6B, and 7.

At block 512, the server (or another component at MNO 202) may determine whether user device 102 is subscribed/registered. This may occur, for example, just after user device 102 has subscribed/registered or after user device 102 has been connected to MNO 202 for a given period of time. If user device 102 is registered (block 512: yes), user device 102 may reattach to MNO 202 (block 514) and be provided with the subscribed services.

If user device 102 has not registered/subscribed (block 512: no), the server may deny further access to MNO 202 (block 516). In such situations, user device 102 may continue to carrier hop to the next available carrier, or attempt to reattach to MNO 202. In some implementations, rather than denying access to user device 102 when user device 102 has not registered or subscribed, the server may allow user device 102 to simply "lounge around" and continue to explore various subscription options, view advertisements, etc.

In process 500, for user device 102 to reach connectivity portal 226, user device 102 has to attach and connect to MNO 202 without a bootstrap profile for the first time and without compromising MNO 202 security. More specifically, at block 504, user device 102 needs to securely access MNO 202 without a bootstrap profile.

Figure 6A:
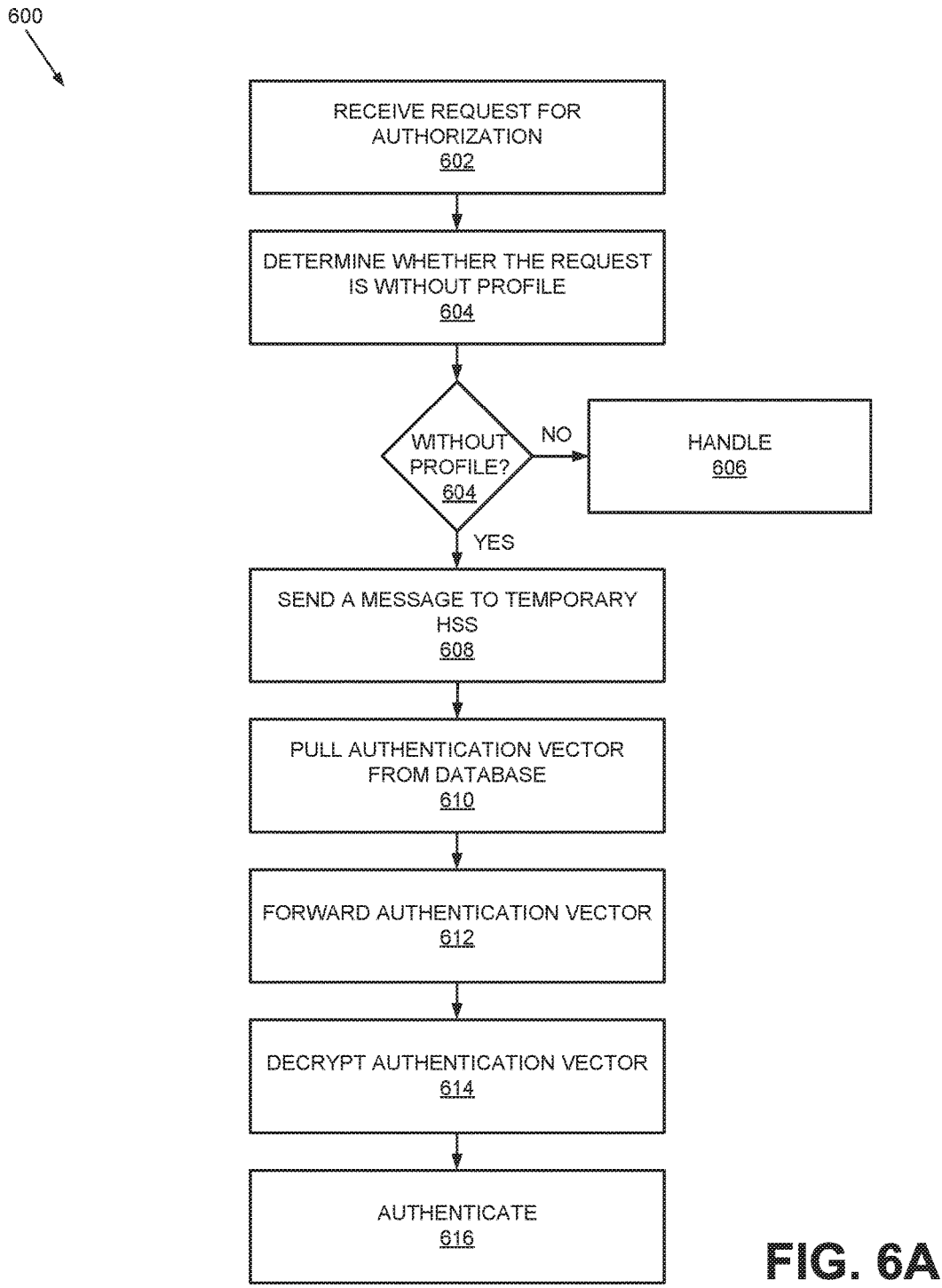
FIG. 6A illustrates an exemplary process for authenticating a user device at a mobile network operator (MNO) when the eUICC in the user device does not include a bootstrap profile for the MNO.
Figure 7:
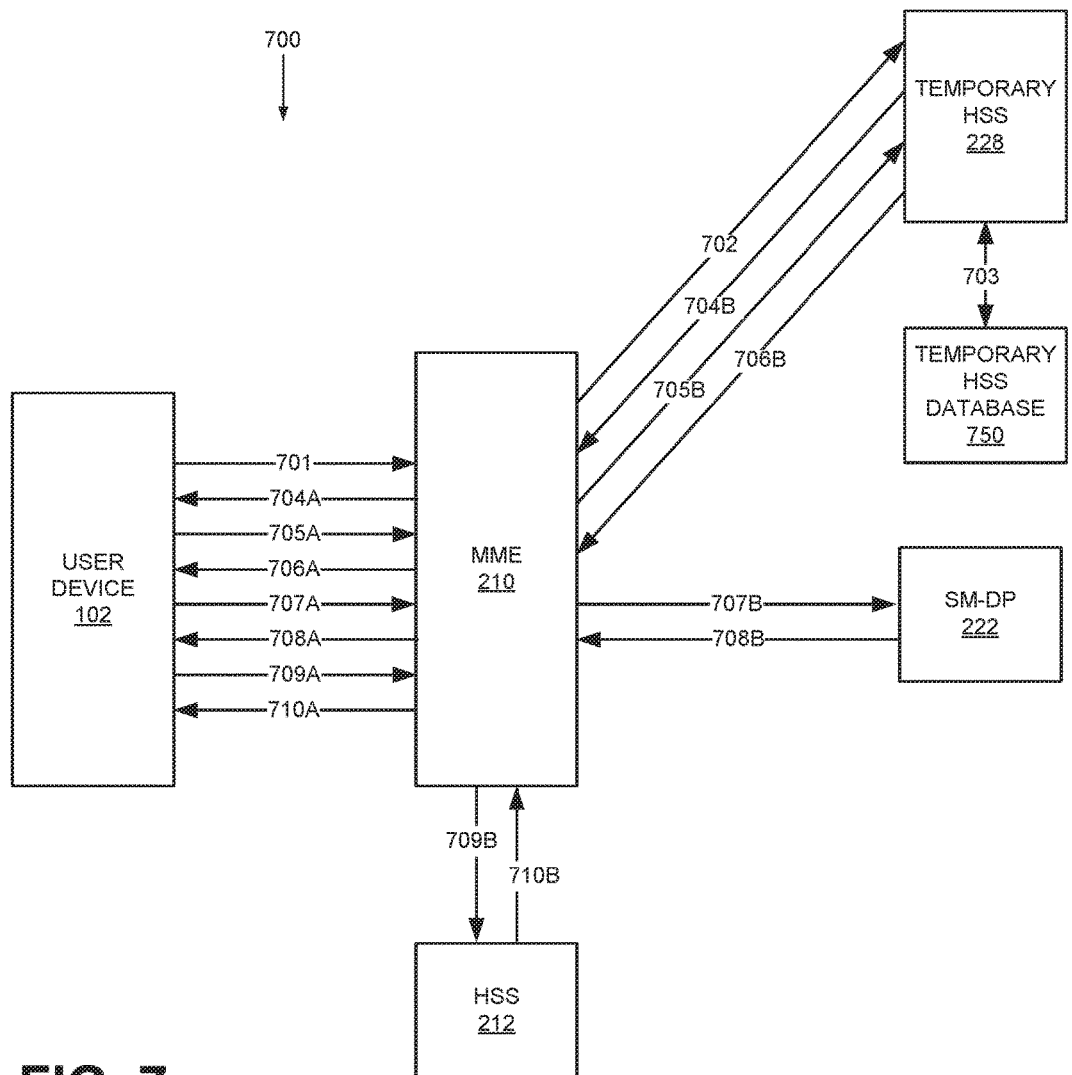
FIG. 7 depicts exemplary messaging between the user device of FIGS. 1 and 2 and some of network components of FIG. 2 during the process illustrated in FIGS. 6A and 6B.

FIG. 6A illustrates a process 600 for accessing an MNO without a bootstrap profile. Process 600 uses a Public Key Infrastructure (PKI) to authenticate user device 202 at MNO 202. FIG. 7 depicts exemplary messaging between the user device 101 and some of network components of FIG. 2 during process 600.

In process 600, user device 102 presents a public key to MNO 202. MNO 202 then encrypts an authentication vector (which includes a symmetric key set) using the public key, and delivers the encrypted authentication vector to user device 102. User device 102 extracts the authentication vector and uses the vector to connect to MNO 202. MNO 202 gives user device 202 limited access. The eUICC in user device 102 may then connect to SM-DP 224 and obtain an MNO operational profile for full service.

For process 600, assume that the connectivity manager of user device 102 has access to a locally stored public key and private key used in PKI. When the connectivity manager on user device 102 attempts to access MNO 202 without using a profile, the connectivity manager constructs a request for authorization to access MNO 202 network. The request may include some data and the public key. During its attempt to attach to MNO 202, user device 102 may forward the request to MNO 202.

Process 600 may include MME 210 in MNO 202 receiving the request, from user device 102, for authorization to access MNO 202 (block 602). FIG. 7 illustrates user device sending the request as signal 701. Upon receipt of the request, MME 210 may determine, based on information provided in the request, whether the request is for accessing MNO 202 without a profile (block 604). In this way, MME 210 may determine whether to obtain authorization from HSS 212 or temporary HSS 228.

If the request is for accessing MNO 202 network without a profile (block 604: yes), MME 210 may send the public key to temporary HSS 228 (block 608). FIG. 7 shows MME 210 sending the public key as signal 702. If the request is not for accessing MNO 202 without a profile (block 604: no), MME 210 may take other appropriate actions to handle the request (block 606).

When the temporary HSS 228 receives the public key, temporary HSS 228 may pull an authentication vector (e.g., a temporary password, user id, etc.) from its database (block 610). The pulling step is shown in FIG. 7 as item 703. Temporary HSS 228 may encrypt the pulled authentication vector using the public key, and return the encrypted authentication vector to MME 210, shown in FIG. 7 as signal 704B from temporary HSS 228 to MME 210.

Process 600 may further include MME 210 forwarding the encrypted authentication vector to user device 102 (block 612; signal 704A from MME 210 to user device 102). When user device 102 receives the encrypted authentication vector from MME 210, user device 102 may use its private key to decrypt the authentication vector (block 614). When user device 102 attempts to access MNO 202 with the decrypted authentication vector (signal 705A from user device 102 to MME 210), MME 210 may authenticate user device 102 (block 616) by consulting temporary HSS 228 (signal 705B from MME 210 to temporary HSS 228) to validate user device credentials. Upon successful validation (signal 706B), MME 210 may give user device 102 limited access to MNO 202 network (signal 706A). Upon unsuccessful validation, MME 210 may deny user device 102 access to the network.

Figure 6B:
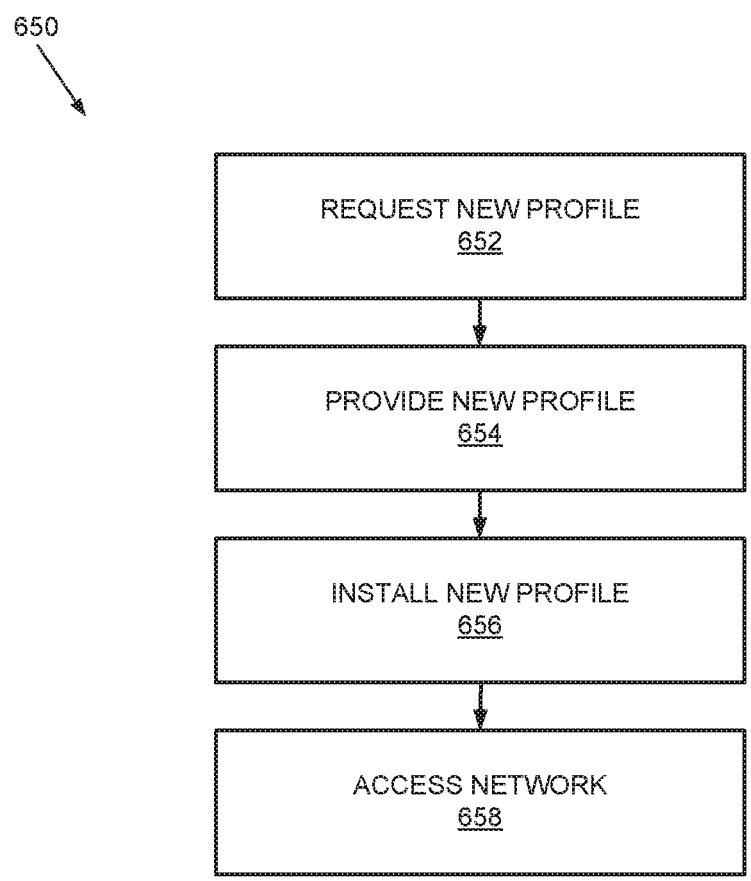
FIG. 6B illustrates an exemplary process associated with registering a user device at the MNO of FIG. 2 after the user device performs the process of FIG. 6A.

FIG. 6B illustrates an exemplary process 650 associated with user device 102 subscribing at MNO 202, As indicated above with reference to process 500, process 650 may accomplish block 510 of process 500.

Process 650 may include user device 102 sending a request for a new profile to SM-DP 224 (block 652; signal 707A from user device 102 to MME 210 and signal 707B from MME 210 to SM-DP 222). In one implementation, user device 102 may initiate the request through its eUICC, which then contacts SM-DP 224. SM-DP 224 responds to the eUICC, by obtaining an MNO profile (block 654) and sending the profile to the eUICC in user device 102 (block 656; signal 708B from SM-DP 224 to NME 210 and signal 708A from MME 210 to user device 102). The eUICC in user device 102 then may install the new MNO 202 profile in its memory/storage.

After process 650, user device 102 may access MNO 202 network based on the stored profile. Signals 709A and 710A illustrate user device requesting access to MNO 202 at MME 210 and MME 210 granting access to user device 102, after consulting HSS 212 (signals 709B and 710B).

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 5, 6A, and 6B and the messaging diagram of FIG. 7, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
   scanning for a carrier by a device that includes an embedded Universal Integrated Circuit Card (eUICC), wherein the carrier is associated with a Mobile Network Operator (MNO);
   hopping on the carrier;
   authenticating, by the device with a network of the MNO, without using any one of one or more MNO profiles stored in the eUICC;
   gaining limited access to the network in response to the authentication;

registering with the network while attached to the network, wherein the registering includes downloading an operational MNO profile to the eUICC in the device; and storing the MNO profile on the eUICC.

2. The method of claim 1, wherein the authenticating includes:

sending a request to gain access to the network without using any one of the one or more MNO profiles, wherein the request includes a public key;

receiving an encrypted authentication vector from the network, wherein the encrypted authentication vector is encrypted with the public key;

decrypting the encrypted authentication vector using a private key corresponding to the public key; and using the authentication vector to access the network.

3. The method of claim 2, wherein the authentication vector includes a symmetric key.

4. The method of claim 1, wherein the scanning includes:

searching for a carrier identified in a list of carriers stored at the device; or applying an algorithm to hop from one carrier to another; or receiving user input that selects the carrier.

5. The method of claim 1, wherein gaining the limited access includes:

connecting to a server in the network, wherein the server permits the device to access the server for a predetermined period of time.

6. The method of claim 1, further comprising:

scanning for another carrier by the device;

establishing a communication link, over the other carrier, with a second network of another MNO;

authenticating the device with the second network of the other MNO, without using any one of the one or more MNO profiles stored on the eUICC; and gaining second limited access to the second network in response to the authentication.

7. The method of claim 6, further comprising:

after gaining the second limited access, disconnecting from the second network and hopping onto a third carrier.

8. A method comprising:

receiving a request for accessing a network from a user device that includes an embedded Universal Integrated Circuit Card (eUICC), wherein the network is associated with a Mobile Network Operator (MNO);

determining if the request is based on a default MNO profile, wherein the default MNO profile is one of one or more MNO profiles stored on the eUICC;

if the request is not based on the default MNO profile, extracting a component of the request;

using the extracted component to obtain an encrypted authentication vector;

sending the encrypted authentication vector to the user device;

when the user device authenticates successfully with the network using the encrypted authentication vector, granting limited network access to the user device.

9. The method of claim 8, further comprising:

registering the user device with the network, by sending an MNO profile to the user device.

10. The method of claim 9, further comprising:

if the user device does not register with the network within a predetermined period of time, denying the user device further access to the network.

11. The method of claim 8, wherein extracting the component includes extracting a public key, and wherein using the extracted component to obtain the encrypted authentication vector includes:

obtaining an authentication vector; and using the public key to encrypt the authentication vector.

12. The method of claim 11, wherein the authentication vector includes a symmetric key.

13. The method of claim 8, wherein the network is a Long-Term Evolution (LTE) network, and wherein the method further comprises:

obtaining, by a Mobility Management Entity (MME), an MNO profile from a Subscription Manager Data Preparation (SM-DP); and sending the MNO profile to the device.

14. The method of claim 13, wherein the encrypted component includes a public key, and wherein using the encrypted component to obtain the encrypted authentication vector includes:

sending, by the MME, the public key to a temporary Home Subscriber Server (HSS);

retrieving, by the temporary HSS, the authentication vector; and using, by the temporary HSS, the public key to encrypt the authentication vector.

15. A device comprising:

an embedded Universal Integrated Circuit Card (eUICC) that stores one or more Mobile Network Operator (MNO) profiles, wherein the eUICC includes a first memory;

a second memory that stores instructions;

a processor to execute the instructions to:

scan for a carrier, wherein the carrier is associated with an MNO;

establish a communication link, over the carrier, with a network of the MNO;

authenticate, with the network of the MNO, without using any one of the one or more MNO profiles;

gain limited access to the network in response to the authentication; and register with the network while attached to the network, wherein when the processor registers with the network, the eUICC receives an operational MNO profile from the network and stores the operational MNO profile in the first memory of the eUICC.

16. The device of claim 15, wherein when the processor authenticates, the processor is configured to:

send a request to gain access to the network without using any one of the one or more MNO profiles, wherein the request includes a public key;

receive an encrypted authentication vector from the network, wherein the encrypted authentication vector is encrypted with the public key;

decrypt the encrypted authentication vector using a private key corresponding to the public key; and use the authentication vector to access the network.

17. The device of claim 16, wherein the authentication vector includes a symmetric key.

18. The device of claim 15, wherein when the processor scans, the processor is configured to:

search for a carrier identified in a list of carriers stored with the device; or apply an algorithm, for performing a process at one carrier and moving onto another carrier; or receive user input that selects the carrier.

19. The device of claim 15, wherein when the processor gains the limited access, the processor is to:

connect to a server in the network, wherein the server permits the device to access the server for a predetermined period of time.

20. The device of claim 15, wherein the processor is further to:
   scan for another carrier;
   establish a communication link, over the other carrier, with a second network of another MNO;
   authenticate the device with the second network of the other MNO, without using any one of the one or more MNO profiles; and
   gain second limited access to the second network in response to authenticating the device with the second network.

* * * * *